United States Patent Office 3,327,993
Patented June 27, 1967

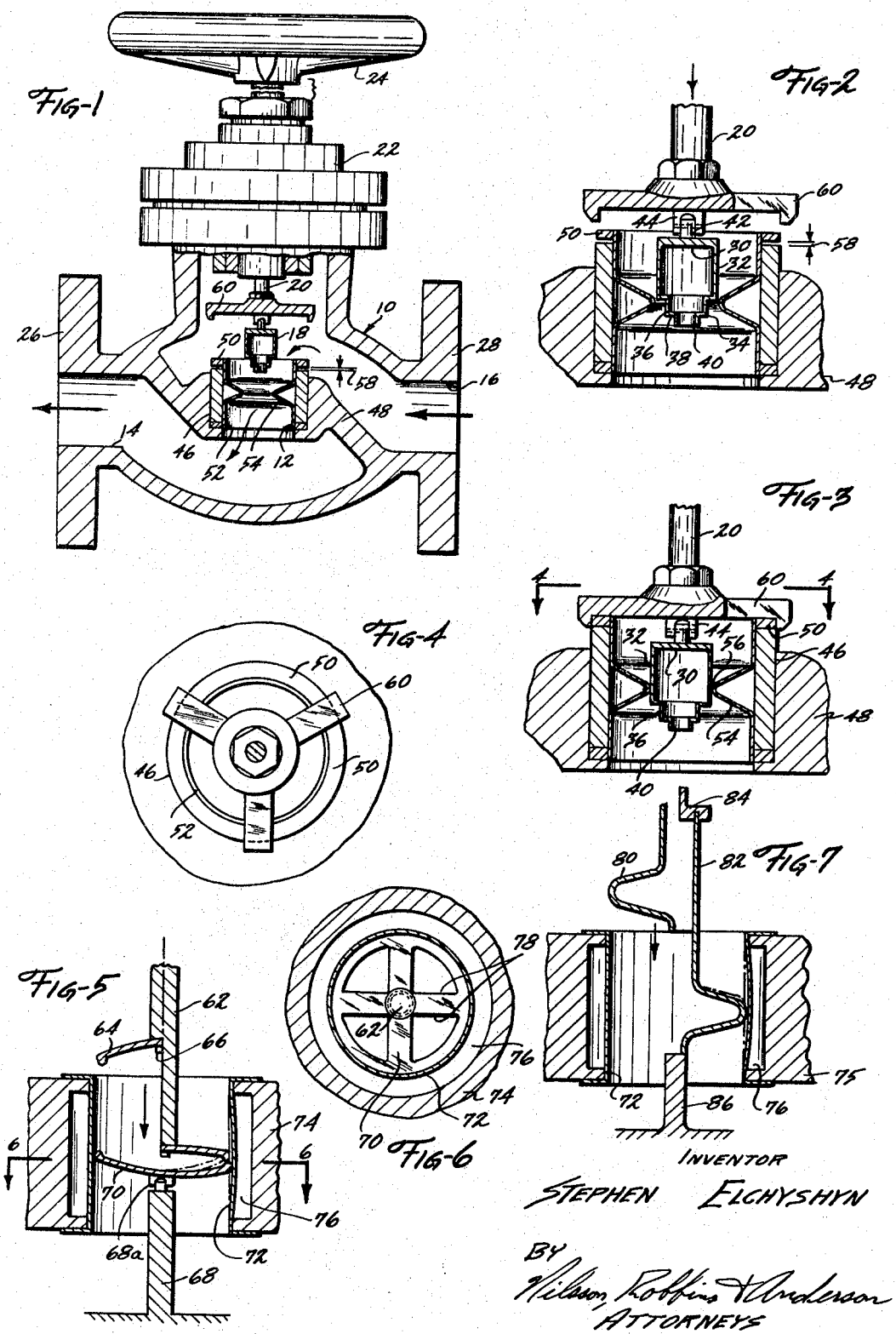

3,327,993
FLUID VALVE STRUCTURE
Stephen Elchyshyn, 23105 Collins St.,
Woodland Hills, Calif. 91364
Filed Sept. 11, 1964, Ser. No. 395,698
2 Claims. (Cl. 251—334)

The present invention relates to a fluid valve structure and specifically to such a structure incorporating a flexure arrangement whereby a valve plug may be variously mated with a valve seat to control the flow of fluid within a wide range of temperature and pressure.

In conventional valves, the closure seal is accomplished by two mating elements, one of which termed the plug, is movable relative to the other, termed the seat, so that their relative position determines the fluid flow. In the past, a variety of techniques have been employed to accomplish a seal between the plug and the seat when they are engaged to close the valve. Specifically, for example, many prior valve structures have included a gasket to accommodate a snug fit between the elements and thereby accomplish the desired seal. Another classification of valves have employed resilient deformation of certain members to accomplish a desired tight and complete seal between the valve elements. However, as effective and widely used as both of these prior types of valves have been, a need remains for an improved valve structure. Specifically, prior valves have not generally been suitable for controlling fluids at exceedingly hot and exceedingly cold temperatures. For example, high temperatures tend to destroy most gasket materials, and tend to distort resiliently-flexible materials as used in prior valves to either open the valve seal or fracture an operating component. Furthermore, valves constructed in accordance with prior proposals, generally encounter considerable difficulty at exceedingly low temperatures because the components of the valves tend to become distorted and cause the valve to fail.

Another problem common to certain types of prior valves, is their tendency to fail as a result of excess mechanical stresses. For example, an imperfect fit between the sealing elements may be caused by temperature variations, so that the valve cannot be completely closed. Such occurrence may result in a manually-operated valve being urged shut with such force as to fracture the mating components or otherwise distort them with the final result that they are totally incapable of forming virtually any seal. Of course, upon such an occurrence, the valve must be replaced or rebuilt. In this regard, several forms of prior valves have been exceedingly expensive to manufacture and maintain.

In view of these considerations, an object of the present invention is to provide an improved fluid valve, which may be economically manufactured and easily maintained, and which is capable of effective operation over a wide range of temperature, and under substantial mechanical stress.

Another object of the present invention is to provide an improved valve for controlling many types of fluids (liquids and gasses) over a wide range of temperature and pressure, and capable of fine control.

Still another object of the present invention is to provide an improved valve, capable of accommodating high flow rates, yet also capable of withstanding exceedingly high forces applied to urge the valve plug into engagement with the valve seat.

A further object of the present invention is to provide an improved valve incorporating a plug with a closed external surface to mate with the closed internal surface of a valve seat, which mating surfaces accomplish an effective seal by resilient deformation resulting from the flexure of a flex surface incorporated in the valve.

One further object of the present invention is to provide an improved valve including a valve seat element having a somewhat cylindrical internal surface for matingly receiving a plug carrying a somewhat annular sealing surface to engage the cylindrical surface while positioned within the cylinder and by flexure of a relatively-thin flex element, to accomplish an effective seal between the elements.

These and other objects and advantages of the present invention will become apparent from a consideration of the following taken in conjunction with the drawing wherein:

FIGURE 1 is a partially sectioned plan view of a manually-operated valve constructed in accordance with the present invention;

FIGURE 2 is an enlarged fragmentary view of FIGURE 1, showing the operating valve component parts in another position;

FIGURE 3 is a view similar to FIGURE 2, showing the component parts in still another operating position;

FIGURE 4 is a sectional view taken along the line 4—4 of FIGURE 3;

FIGURE 5 is a fragmentary sectional view similar to FIGURE 2 showing an alternative form of the structure;

FIGURE 6 is a sectional view taken along line 6—6 of FIGURE 5; and

FIGURE 7 is a view similar to FIGURE 2; however, showing an alternative form of the structure.

Referring initially to FIGURE 1, there is shown a valve body 10 which supports a valve seat 12 between fluid passages 14 and 16. The seat 12 is positioned to matingly receive a valve plug 18 carried on a valve stem 20 which is supported in a packing gland and screw structure 22, and extends therefrom to receive a handle wheel 24. In general, revolving the handle 24 in either a clockwise or a counterclockwise direction moves the plug 18 up or down as a result of a screw (not shown) contained in the structure 22. In this manner, the plug 18 may be mated into the seat 12 to accomplish an effective seal as will be described below; or, alternatively, the plug 18 may be withdrawn from the seat 12 to the position shown to permit the free flow of fluid from the passage 16 through the unobstructed seat 12 into the passage 14.

Considering the structure in greater detail, the structure 22 including a packing gland and a screw mechanism (not shown) serves simply as a means to raise and lower the valve stem 20. Various forms of this structure are well known in the prior art, however, it is also readily apparent, that a wide variety of other structures and means, as electrical, hydraulic and so on, can readily be employed to position the valve plug 18 variously relative the valve seat 12 to accomplish the different stages of closure.

The packing gland and screw mechanism structure 22, carrying the valve stem 20 and the plug 18, is supported in the valve body 10 which also provides support for the valve seat 12. The valve body 10 incorporates terminal flanges 26 and 28 which may be penetrated by threaded bores (not shown) or otherwise fitted to be connected into a fluid duct in accordance with a wide variety of prior-art techniques. Of course, a variety of other forms of valve bodies can be readily substituted for the valve body 10, and although the structure shown herein is to be appreciated as merely exemplary in one operating embodiment, cast bronze has been found a satisfactory material.

Considering the detailed operation of the valve plug 18 in cooperation with the valve seat 12, reference will now be had to the FIGURES 1, 2 and 3. This explanation may be effectively provided by assuming a predetermined position for the component valve elements, and considering the functions of the components somewhat simultaneously with their introduction. Therefore, assume initially, that the valve stem 20 has been placed in a raised position (FIGURE 1) as by revolving the handle wheel 24. In such a raised position, fluid applied to the passage 16 may flow rather freely through the passage 16 through the valve seat 12 (as indicated by arrows), and into the fluid passage 14. It is to be noted, that with the valve elements in the position as shown in FIGURE 1, a clear substantially-unobstructed passage is provided through the valve so as to accommodate a high rate of fluid flow with little impedance.

Now assume that the hand wheel 24 is revolved to lower the valve stem 20, in turn lowering the valve plug 18 matingly into the valve seat 12. The valve plug 18 comprises essentially a stepped cylinder configuration, which is hollow and therefore has a relatively thin curved wall. That is, the upper closed end 30 of the plug 18 is a cylindrical section 32, the other end of which terminates in a reducing shoulder 34 which is integrally formed with a second cylindrical section 36 followed by a shoulder 38 reducing to the smallest cylindrical section 40. Of course the composite valve plug 18 may be variously formed of different materials however, it is important to note that the relatively-thin annular walls of the cylindrical sections are somewhat yieldably deformable of a resilient material, e.g. beryllium copper.

The upper closed end 30 of the plug 18 has an integrally-formed stud 42 extending upwardly and fixed in a universal mount 44 so that the plug 18 may be variously tilted relative the valve stem 20 as the former passes into the valve seat 12. Therefore, the plug 18 can freely assume various positions of axial displacement from the stem 20, to mate and seal to the seat 12 in a floating relationship.

The valve seat 12 includes a hollow cylindrical spacer 46 supported in a diaphragm 48 between the passages 14 and 16 generally coaxial to the stem 20. A pair of external annular flanges 50 and 52 are positioned coaxially at the ends of the spacer 46 and supported by a flexure 54. The flexure 54 is of generally cylindrical configuration, hollow with a thin uniform wall, and having an inwardly projecting tapered, annular land 56 formed therein. The flexure 54 may be formed of various material including beryllium copper and includes a substantial flex surface, which is capable of resilient distortion to vary the internal diameter of the internal land 56.

The flexure 54 is back supported by the spacer 46; however, is not connected and is therefore free for movement relative thereto. The ends of the flexure 54 are affixed in concentric relationship to the annular flanges 50 and 52 so that in the quiescent state, the inherent resiliency of the flexure 54 supports the flange 50 above the spacer 46 by a precise amount as indicated by the reference numeral 58.

Upon closure of the valve by the plug 18 becoming matingly received within the valve seat 12, a spider 60 affixed on the valve stem 20 as by threadably locked engagement, contacts the flange 50 (FIGURE 4) forcing the flange downward into engagement with the spacer 56.

Before considering the functional operation of the spider 60, reference is now made to the stage of closure illustrated in FIGURE 2, wherein the plug 18 is shown matingly received within the land 56 of the flexure; yet, the valve is not totally closed. As each of the stepped cylindrical sections 40, 36, and 32 pass between the narrow annular surface of the land 56, the passage open to pass fluid is radically altered. Of course, the valve plug 18 may be formed as a uniform right circular cylinder so that no variable relationship as described will occur; however, in certain applications, the provision of particular flow rates related to each increment of plug displacement is a considerable advantage. In this regard, virtually any non-linearity or departure from the right-circular-cylindrical sections may be formed at the lower end of the plug 18 in accordance with the desired application and relationship between plug displacement and flow rate, smoothly varying as well as stepped, as shown. In this regard, smoothly tapered lower ends formed in the plug 18 may provide some advantage in certain applications, also serving to guide the plug into mated relationship with the seat 12.

As the valve stem 20 is moved still lower from the position shown in FIGURE 2 to approach the position shown in FIGURE 3, the large section 32 of the plug 18 is matingly received within the land 56. However, at the initial stage of entry of the section 30 within the land 56 the spider 60 has not yet forcefully contacted the flange 50. With the elements in such a position, a small space exists between the external surface of the cylindrical section 32 and the mating internal surface of the land 56. That is, the internal closed annular surface of the land 56 contiguously surrounds the mating external closed surface of the cylindrical section 32. Therefore, the valve may still pass a small amount of fluid.

As the handle wheel 24 or other control means lowers the valve stem 20 below the position described above, the spider 60 forcibly engages the flange 50 closing the small space indicated at 58 (FIGURE 1) by moving the flange 50 into engagement with the upper annular edge of the spacer 46 (FIGURE 3). As a result of this movement, the flexure 54 is stressed over substantially its full area causing the land 56 to be resiliently distorted inwardly to a reduced diameter so that the internal surface of the land 56 is yieldably received by the external cylindrical surface of the section 32 of the plug 18. As a result, a resilient flexure seal is accomplished which is maintained over an exceedingly wide range of temperature and which is not rendered ineffective by the application of normally-excessive pressure or mechanical forces. For example, if the valve stem 20 is urged downward by a substantial force applied to the wheel handle 24, the spider 60 translates the force to the spacer 46 which in turn is held by the diaphragm 48. Therefore, the force is received by a rigid, sturdy structure, which is somewhat isolated from any delicate flexure seal, with the result that the force has no effect on the flexure seal. In this regard, the flexure 54 is flexed by displacement over a pre-established distance, and the application of further force to the flange 50 is of little consequence to the flexure seal.

With respect to temperature variations which may be experienced by the valve elements or temperature extremes, which normally result in material distortion sufficient to produce failure, the structure as disclosed remains effective. That is, the resilient deformation of one valve element by a precisely controlled amount and which is yieldably received by another valve element provides substantial immunity for the seal to temperature variations, within the limits of the materials involved.

Thus, by the use of mating valve elements, e.g. a valve plug and a valve seat, one of which incorporates a flexure surface, and the other of which provides a mating-resiliently yieldable surface, a very effective seal may be accomplished, having a wide range of application and which is economical to manufacture and maintain. Of course, the valve of the present invention may take other forms than that described above, and exemplary embodiments of such forms are shown in FIGURES 5, 6 and 7, the first form of which will now be considered with references to FIGURES 5 and 6.

FIGURE 5 shows a valve stem 62 which may be motivated by a hand wheel or other control apparatus to be raised and lowered as previously described with reference to the structure of FIGURE 1. At the lower end of the valve stem 62 a resilient concave-convex disk 64 is attached by a threadably-received stud 66. Aligned with the stem 62 is an upwardly-extending support abutment 68 which carries a ported concave-convex disk 70 on a universal mount 68a. The disk 70 is fixed to be stationary in the valve seat which includes a thin-walled cylinder 72, end lapped over a somewhat cylindrical opening in a valve diaphragm 74 so as to provide an annular cavity 76 behind the cylinder 72. Ports 78 (FIGURE 6) through the disk 70 accommodate fluid to flow freely therethrough when the disk 64 is in the raised position.

In the operation of the valve structure of FIGURE 5, lowering the disk 64 into mating engagement with the cylinder 72 obstructs the passage considerably and reduces the rate of flow therethrough. However, the passage is not sealed closed until the disk 64 engages the disk 70 providing an "oil-can" flexure thereof, with the result that the disk 64 being of concave-convex nature expands to an increased diameter thereby engaging the cylinder 72 which is resiliently deformed and yields to accommodate the resilient increase in diameter of the disk 70.

In another form of the valve structure of the present invention, as shown in FIGURE 7, an external land 80 is formed contiguous the end of a flexure tube 82. The land 80 and the tube 82 then function as the valve plug motivated by a valve stem 84 as previously described. Flexure of the tube 82 to increase the diameter of the land 80 is accomplished when the tube abuts a projection 86 extending upward into a valve seat or cylinder 72 substantially as described with reference to FIGURE 5. Therefore, in the operation of the structure of FIGURE 7, the flexure is provided in the valve plug as a result of the flexure surface of the tube 82 while the resiliently yielding member is provided as the cylinder 72 in the valve seat.

In view of the above considerations, it is readily apparent that the valve mechanism of the present invention may be effectively used in a wide range of applications and may take a substantial variety of different forms. However, it is to be understood, that the scope of the present invention is not to be restricted to the various embodiments described herein; rather, the scope of the present invention shall be defined in accordance with the appended claims.

What is claimed is:
1. A valve comprising:
   a first valve element comprising a cylinder defining a resiliently deformable external annular surface and a second valve element comprising a flexible tube having a land defining a resiliently deformable internal annular surface, said cylinder being receivable within said tube, at least one of said elements including a flexure surface;
   housing means for supporting said first and second valve elements and defining a passage to said internal annular surface;
   position control means for altering the position of one of said elements relative to the other of said elements whereby to position and remove said external annular surface contiguous said internal annular surface;
   flexure means connected to be controlled by said position control means to resiliently deform one of said annular surfaces into yielding engagement with said other of said annular surfaces by flexing said flexure surface, to seal said external annular surface to said internal annular surface.

2. A valve according to claim 1 wherein said flexure means comprises means for compressing said tube to flex said internal land inwardly.

References Cited

UNITED STATES PATENTS

| | | | |
|---|---|---|---|
| 1,721,324 | 7/1929 | Wilson | 251—334 X |
| 2,192,339 | 3/1940 | Wilson | 251—334 |
| 3,185,438 | 5/1965 | Smirra | 251—334 |

M. CARY NELSON, *Primary Examiner.*

R. C. MILLER, *Assistant Examiner.*